United States Patent
Escudero et al.

(10) Patent No.: US 8,916,118 B2
(45) Date of Patent: Dec. 23, 2014

(54) CO2 AND SO2 CAPTURE METHOD

(75) Inventors: Cristian Cardenas Escudero, Sevilla (ES); Luis Maria Esquivias Fedriani, Sevilla (ES); Victor Morales Florez, Madrid (ES); Alberto Santos Sanchez, Cadiz (ES)

(73) Assignees: Consejo Superior De Investigaciones Cientificas, Madrid (ES); Universidad De Sevilla, Seville (ES); Universidad De Cadiz, Cadiz (ES)

( * ) Notice: Subject to any disclaimer, the term of this patent is extended or adjusted under 35 U.S.C. 154(b) by 0 days.

(21) Appl. No.: 14/116,566
(22) PCT Filed: May 9, 2012
(86) PCT No.: PCT/ES2012/000131
§ 371 (c)(1),
(2), (4) Date: Feb. 11, 2014
(87) PCT Pub. No.: WO2012/152963
PCT Pub. Date: Nov. 15, 2012

(65) Prior Publication Data
US 2014/0178277 A1  Jun. 26, 2014

(30) Foreign Application Priority Data
May 10, 2011  (ES) .................................. 201100536

(51) Int. Cl.
B01D 53/50   (2006.01)
B01D 53/62   (2006.01)
C01D 5/02    (2006.01)
B01D 53/96   (2006.01)

(52) U.S. Cl.
CPC ............ B01D 53/502 (2013.01); B01D 53/501 (2013.01); B01D 53/62 (2013.01); B01D 53/96 (2013.01); Y02C 10/04 (2013.01); B01D 2251/404 (2013.01); B01D 2257/504 (2013.01)
USPC . 423/225; 423/230; 423/243.08; 423/243.11; 423/244.08; 423/551

(58) Field of Classification Search
USPC .......... 423/225, 230, 243.08, 243.11, 244.08, 423/551
See application file for complete search history.

(56) References Cited

U.S. PATENT DOCUMENTS 6,737,031 B2 *  5/2004  Beal et al. ..................... 423/230

FOREIGN PATENT DOCUMENTS

JP         5-23535 A     *  2/1993   ............. B01D 53/34
WO   WO 94/12266 A1   *  6/1994   ............. B01D 53/34

OTHER PUBLICATIONS

Manovic et al, "Sulphation and Carbonation properties of hydrated sorbents from a fluidized bed CO2 looping cycle reactor", Elsevier, Fuel 87, (2008) pp. 2923-2931.

(Continued)

Primary Examiner — Timothy Vanoy
(74) Attorney, Agent, or Firm — Hayes Soloway P.C.

(57) ABSTRACT

The invention relates to a $CO_2$ y $SO_2$ capture method comprising the following steps consisting in: a) introducing an aqueous stream of a hydroxide of an alkali or alkaline-earth metal and another gas stream of $CO_2$ into a bubble column purifier/reactor, in order to form a carbonate of the alkali or alkaline-earth metal; b) introducing the carbonate of the alkali or alkaline-earth metal into a bubble column purifier/reactor, into which a stream of a gas mixture of $CO_2$ and $SO_2$ is introduced in order to form sulphite of an alkali or alkaline-earth metal and carbon dioxide; c) transforming the sulphite from step (b) into sulphate of said metal by means of oxidation with air; and d) re-circulating the unreacted $CO_2$ produced during step (b) by reacting the slurry with the $SO_2$, in the reactor from step (a).

7 Claims, 2 Drawing Sheets

(56) References Cited

OTHER PUBLICATIONS

Anderson et al, "Surface textural changes during reaction of $CaCO_3$ crystals with $SO_2$ and $O_2$ (air)", Elsevier Science Ltd, Fuel (1995) vol. 74, No. 7, pp. 1018-1023.

Morales-Florez et al, "Artificial weathering pools of calcium-rich industrial waste for $CO_2$ separation", Chemical Engineering Journal 166 (2011) pp. 132-137.

Rodriguez et al, "Average activity of CaO particles in a calcium looping system", Chemical Engineering Journal 156 (2010) pp. 388-394.

Sun et al, "Removal of $CO_2$ by Calcium-based Sorbents in a Presence of $SO_2$", Energy & Fuels 21 (2007) pp. 163-170.

* cited by examiner

CO2 AND SO2 CAPTURE METHOD

This invention refers to a process for using the product of the mineral sequestration of carbon dioxide. The process described here comprises the use of the product of the mineral sequestration of CO2 for fixing SO2. Specifically, the various processes described here are based on both reuse of industrial waste and use and exploitation of the products obtained from CO2 sequestration. The aim of this new process is to reduce emissions of both of the greenhouse gases, CO2 and SO2.

BACKGROUND OF THE INVENTION

One of the most promising technologies in the capture and storage of carbon dioxide ($CO_2$) is related to the fixation of this gas in the form of insoluble inorganic carbonates. This fixation is achieved by a chemical reaction, known as mineral carbonation or mineral sequestration. The use of calcium-rich minerals from industrial waste or urban solid waste, *Journal of Hazardous Materials B*128, 73-79 (2006), is one strategy proposed for increasing technological and economic viability of mineral sequestration of $CO_2$. For example, techniques for reusing residues rich in calcium hydroxide from the paper industry (*Journal of Hazardous Materials* 161, 1347-1354 (2009)) or the acetylene production industry (*Chemical Engineering Journal* 166, 132-137 (2011)) have been proposed. These lines of work have been studied at a theoretical level. Lackner et al., (*2nd U.S.-China Symposium on CO2 Emissions Control Science & Technology* May 28-30, 2008) for example compared renewable energy technologies (aerogenerators and photovoltaic plates) to a combined technology of energy generation plants based on fossil fuels together with $CO_2$ sinks. The main problem with this mineral sequestration technique for $CO_2$ is the large amount of calcite generated as a result of the currently enormous $CO_2$ emissions.

Other authors in basic research studies have proposed the use of lime from mineral calcite for separating mixtures of industrial gases (U.S. Pat. No. 7,618,606B2). Strategies have been developed for temporary capture of $CO_2$ by mineral fixation and its regeneration by cycles of calcination and carbonation (*Energy Fuel* 2006; 21:163-70), considering methods for regenerating and reactivating the sorbent, lime (*Chemical Engineering Journal* 2010; Volume 156, Issue 2, Pages 388-394). These routes have been proposed for separating $CO_2$ from a mixture of gases for its geological sequestration (*Progress in Energy and Combustion Science* 2010; Volume 36, Issue 2, Pages 260-279).

The technology and current process for reducing $SO_2$ emissions in combustion gas currents is based on contact between the gas and an aqueous suspension of mineral calcite. This aqueous suspension is obtained by crushing the calcite obtained from mines and subsequent addition of water to create a calcite slurry. This process requires mining activities, with the consequent harm to the landscape, $CO_2$ emissions due to huge energy consumption during extraction (5-11 kg $CO_2$ per hour), crushing (174-412 kg $CO_2$ per hour) and transport of the mineral (50-118 kg $CO_2$ per hour); currently there are studies seeking cycles of calcination and carbonation to reactivate the calcite in the process of capturing $SO_2$ (*Energy Fuel* 2008; Volume 87, Issue 13-14, Pages 2923-2931); there are also patents where the mineral calcite is prepared with certain physical properties, large surface area and high pore density that make it more reactive toward $SO_2$ (U.S. Pat. No. 5,779,464 (A)).

In one of the option currently used, this slurry is led to a damp scrubber (EP1958682A1 and JP61167432A) where it is pumped from the bottom of the scrubber to sprayers at the top. There it atomises and comes into contact with a countercurrent of $SO_2$, which is absorbed in the form of $CaSO_3$. The calcium sulphite falls to the bottom of the scrubber where bubbling air oxidises the $CaSO_3$ to $CaSO_4$ for removal from the process (*Fuel* 1995; Volume 74, Issue 7, Pages 1018-1023).

Another option that is currently used is a semi-dry scrubber. The difference between this and the wet scrubber is based on the pumping of the slurry, which is performed with just the right amount of water so that it is completely evaporated by spraying. The absorption of $SO_2$ takes place while the slurry evaporates, thus producing the dry product, $CaSO_4$.

These two options have the drawback that, on only capturing the $SO_2$, the used calcite generates $CO_2$ that is emitted to the atmosphere.

The removal of $SO_2$ from the gases by scrubbers has given rise to new studies and/or patents seeking ways of regenerating the sorbent that captures the $SO_2$. This regeneration is mainly based on adding a reagent to the products generated in the capture of the $SO_2$ to obtain the initial sorbent and other secondary products. Thus, JP2000051649A reveals the use of $Mg(OH)_2$ for capturing $SO_2$. Subsequently a calcium salt is added in caustic soda to regenerate $Mg(OH)_2$ and also to form gypsum and a sodium salt. Another process proposed in U.S. Pat. No. 7,247,284B1 is based on the capture of $SO_2$ with caustic soda, followed by subsequent addition of $Ca(OH)_2$ to the $Na_2SO_4$ formed, thereby regenerating the caustic soda and precipitating the gypsum.

These processes are applied only to the reduction of $SO_2$ emissions, this being their main negative aspect, as well as the generation of large amount of gypsum and other products such as sodium salts (*Fuel* 1995; Volume 74, Issue 7, Pages 1018-1023), which affect the aquatic environment as they are in the form of brine. Envirotech Corporation (U.S. Pat. No. 3,873,532 (A)) proposed the prior absorption of $SO_2$ with a caustic soda solution, subsequently adding lime to regenerate the original soda.

For the combined reduction of $CO_2$ and $SO_2$, U.S. Pat. No. 5,958,353A proposed the absorption of $CO_2$ and/or $SO_2$ with a basic solution, subsequently adding a soluble calcium salt and so fixing the $CO_2$ and/or $SO_2$ as $CaCO_3$ and $CaSO_3$ respectively and together, using commercial pure sorbents at all times.

Therefore it is necessary to develop a process for capturing $CO_2$ and $SO_2$ that avoids the problems described above.

DESCRIPTION OF THE INVENTION

This invention refers to a process of capturing $CO_2$ and $SO_2$ that solves the drawbacks described in the state of the art, given that:
- The solution it proposes is the use of calcite generated by mineral sequestration of $CO_2$ for the capture of $SO_2$.
- It does not use cycles of calcination and carbonation, but instead proposes definitive fixation of the greenhouse gases using fresh sorbent derived from the wastes of other industries and its reaction with one of the gases giving a by-product that helps to remove the other gas.
- The process does not require mining operations, or crushing, or transport of the mineral; this implies a saving of $CO_2$ emissions. There are also no sorbent reactivation cycles required, because sorbent is continuously produced fresh from the capture of the other gas. The physical properties of the generated calcite, small particle size and high pore density, make prior preparation to obtain a large specially reactive surface area unnecessary because of the nature of the waste from which it comes.
- The $CO_2$ produced is also sequestrated, avoiding its emission to the atmosphere.
- The gypsum is not the final product but is used in the process to regenerate a reagent, $Ca(OH)_2$, and another commercially useful by-product ($Na_2SO_4$), which is not produced in such large amounts as the gypsum, and the main advantage is that of removing both $SO_2$ and $CO_2$.

The capture of $CO_2$ and $SO_2$ takes place in distinct phases, so the products produced are not mixed, an advantage for their commercialisation; neither are soluble salts used in the process, either prepared previously or from mining operations, but all the salts or solutions used are waste products.

Therefore the present invention reveals a process for the use of the product of the mineral sequestration of carbon dioxide. The process described comprises the use of the product of mineral sequestration of $CO_2$, calcite, for the fixation of $SO_2$. Specifically, the distinct processes described are based on the reuse both of industrial wastes and the use and exploitation of the products obtained from the sequestration of $CO_2$. The aim of this process is to reduce emissions of both greenhouse gases, $CO_2$ and $SO_2$. The complete cycle will produce other species that may be used to generate the initial reagent or may be exploited and commercialised.

Therefore this invention comprises a process of capturing $CO_2$ and $SO_2$ that comprises the following stages:

a) introduction of one aqueous current of an alkali or alkaline earth metal hydroxide and another of gaseous carbon dioxide into a bubble column scrubber-reactor, where the bubbling of $CO_2$ in the aqueous current forms a carbonate of the alkali or alkaline earth metal;

b) introduction of the alkali or alkaline earth metal carbonate from stage a) into a bubble column scrubber-reactor in which a current of gaseous mixture of carbon dioxide and sulphur dioxide is introduced, to form an alkali or alkaline earth metal sulphite and carbon dioxide;

c) transformation of the alkali or alkaline metal sulphite of stage b) into a sulphate of this metal by oxidation with air; and d) recirculation of the unreacted carbon dioxide, produced in stage b) by the reaction of the slurry with sulphur dioxide, into the reactor of stage a).

In a preferred embodiment, the alkali or alkaline earth metal hydroxide comes from the acetylene production industry, water softening industry and/or the paper industry.

In another preferred embodiment, the hydroxide is from alkaline earth metals, preferably calcium.

In another preferred embodiment, after stage d) an additional stage e) is performed, in which alkali metal sulphate waste obtained from any industry and/or the sulphate from stage c) is made to react with a caustic soda solution from the milk industry, olive industry, aluminium production by treatment of bauxite industry or as a by-product of chlorine from salt water, and thereby obtaining the alkali or alkaline earth metal hydroxide and a solution of sodium sulphate.

In another preferred embodiment, the hydroxide from stage e) is mixed with the hydroxide of stage a) to be introduced into the reactor of stage a).

In general, the process follows the following reaction schema:

Stage a):

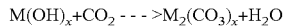

M(OH)$_x$+CO$_2$ - - - >M$_2$(CO$_3$)$_x$+H$_2$O

Stage b):

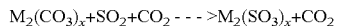

M$_2$(CO$_3$)$_x$+SO$_2$+CO$_2$ - - - >M$_2$(SO$_3$)$_x$+CO$_2$

Stage c):

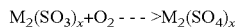

M$_2$(SO$_3$)$_x$+O$_2$ - - - >M$_2$(SO$_4$)$_x$

Stage e):

NaOH+M$_2$(SO$_4$)$_x$ - - - >M(OH)$_x$+Na$_2$SO$_4$ where:

M is an alkali or alkaline earth metal, x is a whole number selected from 1 or 2, depending on whether M is an alkali or alkaline earth metal.

For experts in the field, other objects, advantages and characteristics of the invention will emerge partly from the description and partly from the practice of the invention.

The following examples and figures are provided for illustration purposes and are not intended to be limiting of the invention.

EXAMPLES

Example 1

The electricity generating plant "UPT Almeria" in Carboneras according to the Ministry of Environment, Rural and Marine Affairs, emitted: 5,000,000 t $CO_2$ and 15,300 t $SO_2$ in 2008. Based on calculations of the amount of residue necessary for total capture of the $SO_2$, 23,906 t/year of $CaCO_3$ would be required.

Figure 1:
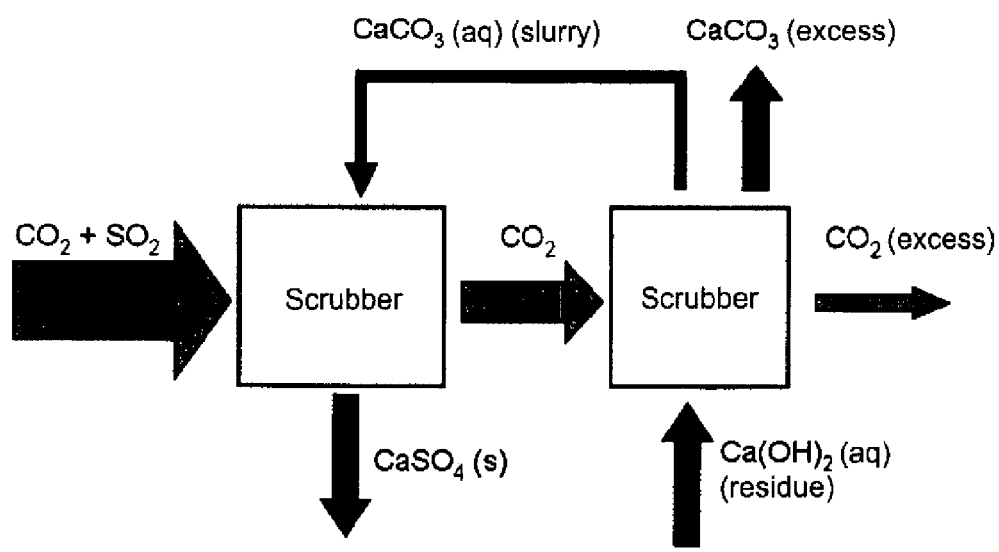
FIG. 1. Schema of the process-invention involving the reuse of residues rich in portlandite and reduction of $CO_2$ and $SO_2$ emissions.

In an embodiment of the invention and according to FIG. 1, 65,000 t/year of residue were obtained with 30% by weight of portlandite and traces of other minerals using a suspension-residue supply network from various generating industries (acetylene production, water softening, paper making, etc.). This suspension-residue was introduced directly into the scrubber, capturing 11,594 t/year $CO_2$ by induced carbonation, generating 26,351 t/year of $CaCO_3$ and 4,743 t/year of $H_2O$. The mineral sequestration product of $CO_2$ is an aqueous suspension of calcium carbonate, which contains 34.5% by weight of calcite. Of the total amount of slurry, only 23,906 t/year of $CaCO_3$ were sent to the $SO_2$ scrubber, necessary to fix all the $SO_2$, leaving 2,445 t/year of $CaCO_3$ left over and generating 32,512 t/year of gypsum.

These numbers show that 100% of $SO_2$ emissions and 0.02% of the direct $CO_2$ emissions were removed from the plant. Indirectly, owing to in situ production of calcite by carbonation of residues rich in calcium, $CO_2$ emissions and the costs derived from mining operations, transport and preparation of the slurry, estimated at approximately 229-540 kg $CO_2$ per hour of mine work, were zero. The emission of $CO_2$ that would otherwise have been derived from the capture of $SO_2$ with calcite alone (10,518 t/year) was also eliminated. From another point of view, this embodiment of the invention resulted in the use of part of the $CO_2$ emitted to the atmosphere as a reagent for obtaining another of the materials necessary in the electricity generation plant, calcite.

Example 2

Figure 2:
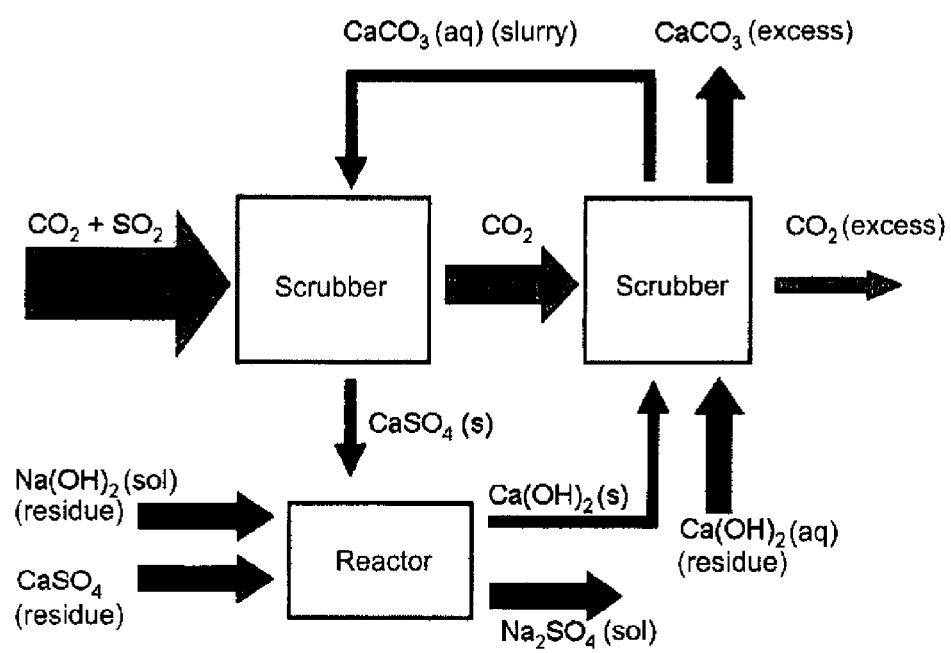
FIG. 2. Schema of the extension of the process-invention with the involvement of caustic soda.

The company TIOXIDE in Huelva, according to the Ministry of Environment, Rural and Marine Affairs, generated emissions of: 132,000 t $CO_2$, 404 t $SO_2$ and 38,400 t of residues rich in gypsum in 2008. In an embodiment of the invention, according to FIG. 2, all the calcium sulphate was used in the reaction with caustic soda to generate portlandite. In this case, 22,560 t/year of NaOH were also used. This reaction produced 20,868 t/year of Ca(OH)$_2$ and 40,055 t/year of Na$_2$SO$_4$. With the generated portlandite, 12,408 t/year of $CO_2$ were captured, producing 28,200 t/year of calcite, of which 23,906 t were recycled for fixing all the $SO_2$ emitted, as shown in the previous example.

In summary, the total balance of products of the process were: 857 t/year of gypsum, 4,294 t/year of calcite and 40,044 t/year of sodium sulphate. The emissions per year were: 10% less of $CO_2$ and 100% less of $SO_2$.

The invention claimed is:

1. Process for capturing $CO_2$ and $SO_2$ consisting of the following stages:
   a) introduction of one aqueous current of calcium hydroxide and another of gaseous carbon dioxide into a bubble column scrubber-reactor to form calcium carbonate;
   b) introduction of the calcium carbonate from stage a) into a bubble column scrubber-reactor in which a current of a gaseous mixture of carbon dioxide and sulphur dioxide is introduced to form calcium sulphite and carbon dioxide;
   c) transformation of the calcium sulphite of stage b) into the sulphate of this metal by oxidation with air; and
   d) recirculation the unreacted carbon dioxide, produced in stage b) by reaction with the slurry with sulphur dioxide, into the reactor of stage a);
   wherein an additional stage e) is performed in which alkali metal sulphate obtained as waste from any industry and/or the sulphate from stage c) is made to react with a caustic soda solution to obtain calcium hydroxide and a solution of sodium sulphate.

2. The process of claim 1 wherein the caustic soda comes from the milk industry, olive industry, aluminium produced by treatment of bauxite industry or a by-product of chlorine from salt water.

3. The process of claim 1 wherein the hydroxide of stage e) is mixed with the hydroxide from stage a) to be introduced into the reactor of stage a).

4. The process of claim 3 wherein the alkaline earth metal is calcium.

5. The process of claim 1 wherein after stage d) an additional stage e) is performed in which alkali metal sulphate obtained as waste from any industry and/or the sulphate from stage c) is made to react with a caustic soda solution to obtain the alkali or alkaline earth metal hydroxide and a solution of sodium sulphate.

6. The process of claim 5 wherein the caustic soda comes from the milk industry, olive industry, aluminium production by treatment of bauxite industry or as a by-product of chlorine from salt water.

7. The process of claim 5 wherein the hydroxide from stage e) is mixed with the hydroxide of stage a) to be introduced into the reactor of stage a).

* * * * *